Feb. 9, 1965  H. W. PROCTOR ETAL  3,169,202
ELECTROMAGNETIC ACTUATORS HAVING CONTINUOUSLY ROTATING FIELD
Filed Feb. 15, 1963  2 Sheets-Sheet 2
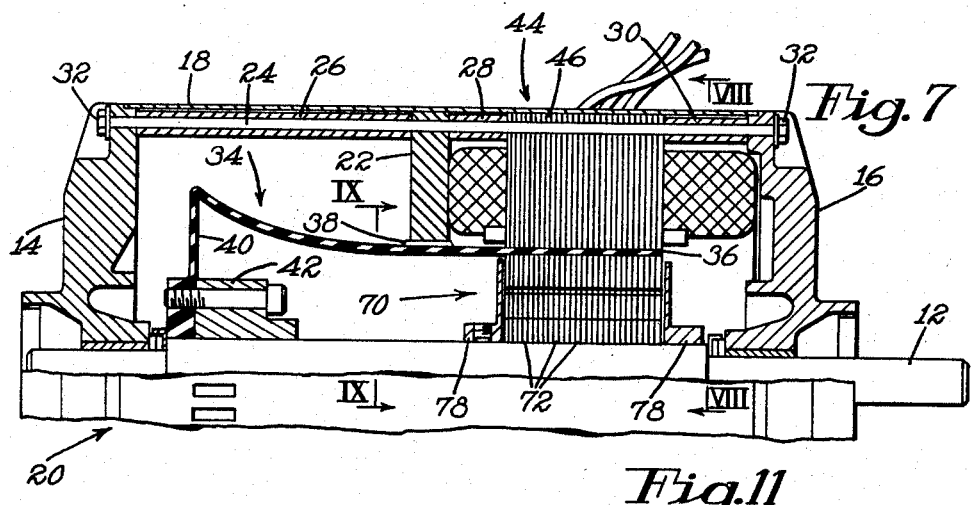
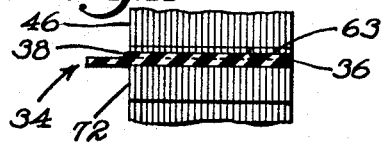
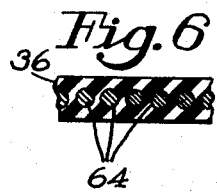
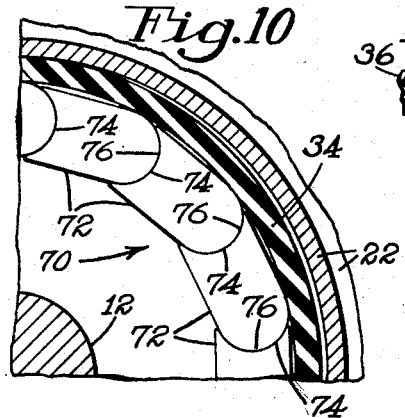
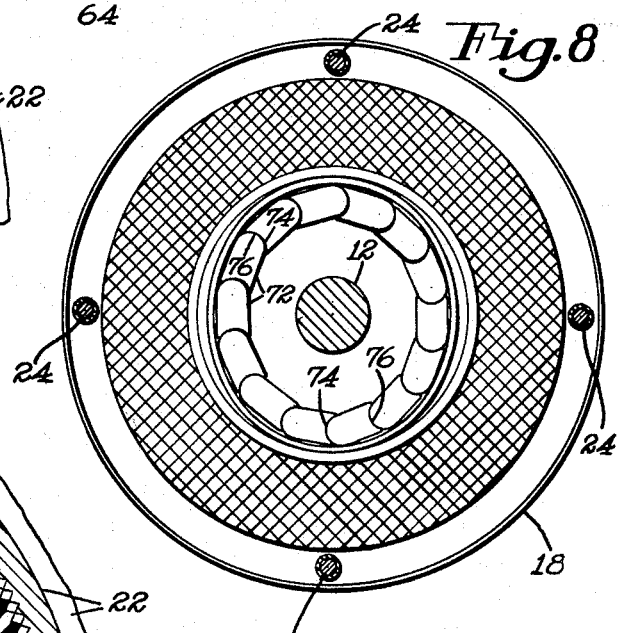
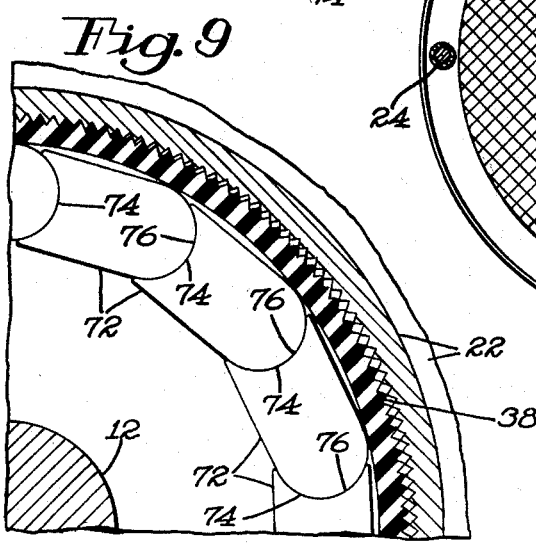

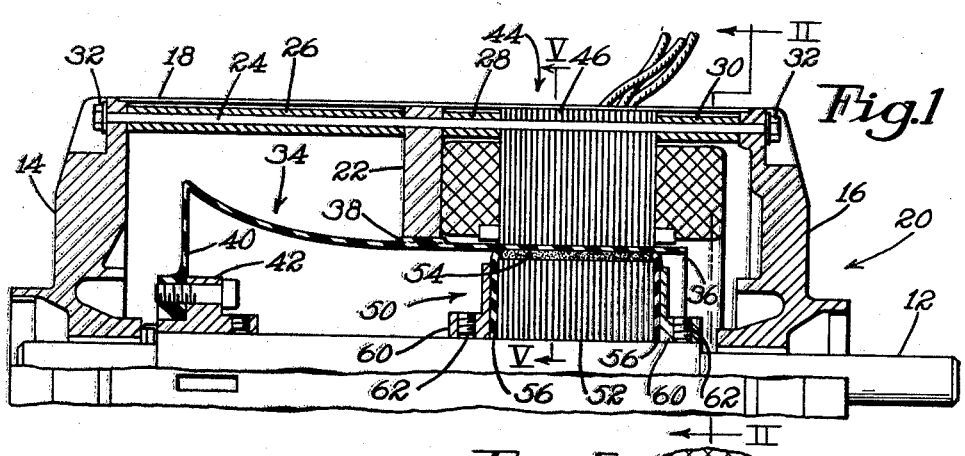
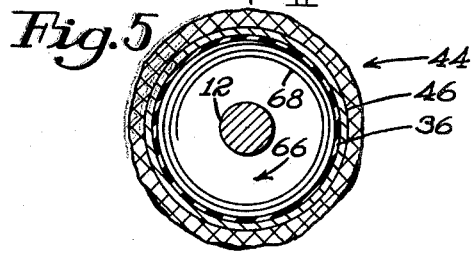
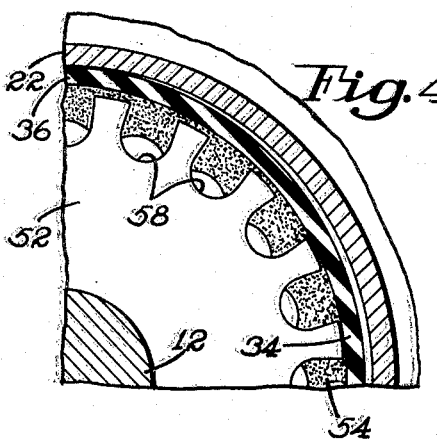
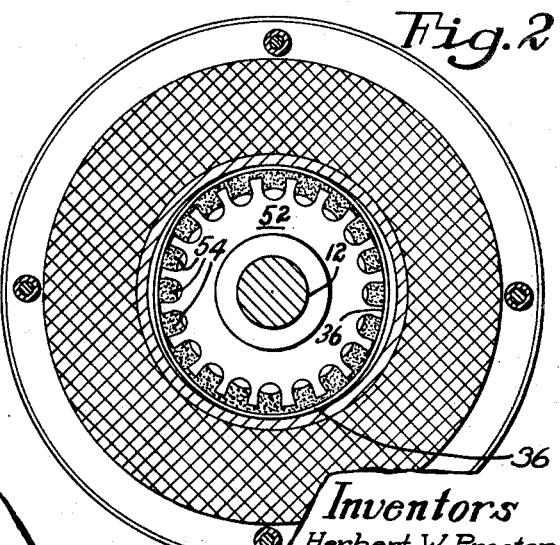
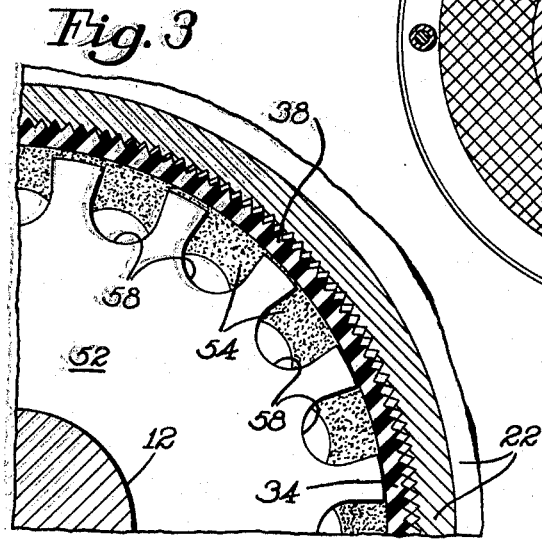
Inventors
Herbert W. Proctor
Donald F. Herdeg
Willard B. Spring
Hugh A. Robinson
Gifford P. Scott
By their Attorney
Carl E. Johnson.

United States Patent Office 3,169,202
Patented Feb. 9, 1965

3,169,202
ELECTROMAGNETIC ACTUATORS HAVING CONTINUOUSLY ROTATING FIELD
Herbert W. Proctor, Danvers, Donald F. Herdeg, Beverly, Willard B. Spring, Topsfield, Hugh A. Robinson, Wenham, and Gifford P. Scott, Beverly, Mass., assignors to United Shoe Machinery Corporation, Flemington, N.J., a corporation of New Jersey
Filed Feb. 15, 1963, Ser. No. 258,734
14 Claims. (Cl. 310—83)

This invention relates to electromagnetic rotary actuators of the general type employing elastic body mechanics as disclosed for instance in United States Letters Patent 2,906,143, issued September 29, 1959, in the name of C. W. Musser. More particularly this invention pertains to an electromagnetic actuator having a continuously rotating field and an unusually high acceleration capability approaching that of the device disclosed in an application, Serial No. 258,707, currently filed herewith in the names of Willard B. Spring et al. While the subject invention is herein illustrated as embodied in alternate forms of a rotary, low cost actuating device, and both with and without interengaging teeth being employed, it is to be noted that in these and other novel aspects the invention is not necessarily limited.

In the above-mentioned patent the broad idea of electrically actuated strain inducers is schematically shown and briefly described. So far as is known, however, no electromagnetically actuated device of the harmonic drive type has ever hitherto been constructed or operated for performing useful work. The invention disclosed herein and in the copending application noted above both embody practical improvements predicated on the use of electromagnetically propagated strain waves for shaping and advancing the changed shape of a flexible tubular output member, but their constructions do differ significantly. In the copending application the arrangement is such that a plurality of substantially closed loops of flux is employed to produce a stepping field whereas, as hereinafter described, in the present invention there is essentially but one closed loop of flux for the entire device. The general distinction then, apart from features of armature and output member design, is that actuators of the type herein to be disclosed act somewhat in the manner of a synchronous motor with its phased rotary flux field and permit a considerably simpler control circuit, hence fewer parts and more economic construction. It is to be noted that devices of the type disclosed herein as well as in the copending application are well adapted to perform in ordinary, economical, low speed actuation as well as in the high temperatures and hard vacuum of space work since brushes, high speed bearings and conventional gearing are eliminated.

In view of the foregoing it is an object of this invention to provide a compact, non-complicated electromagnetic actuator having a continuously rotating field and further characterized by having, for its output power, a high acceleration-deceleration capability relative to that of known devices. To this end the invention comprises, in novel combination, in an electromagnetic actuator, a reaction ring, means for providing a continously rotating sine wave flux field about the axis of the ring, a radially deflectable tubular output member coaxial with the ring, and armature means radially responsive to the field means for deflecting the member at spaced peripheral localities into operative engagement with the ring, whereby the localities of engagement are progressed circumferentially to drive the member. While the tubular member desirably is in the form of a flexspline, it will be understood that it need not be formed with threads (indeed operation may be considerably more quiet when the member and ring are not formed with splines), and that it may also be of the single or double-bell form or cylindrically cup-shaped when desired. Also, while the flexspline is illustrated herein as being of flexible, high-strength plastic, for instance Delrin, to keep eddy current loss minimal, it will be aprpeciated that in many applications the tubular member or flexspline may be wholly of metal, or it may be of suitable plastic having metal reinforcement elements, such as wire, embedded therein to facilitate passage of flux without appreciable eddy current loss.

As herein illustrated one armature means is in the form of a flexible, endless chain of rigid, conductive links circumferentially engageable with the flexspline output member, the links being disposed closely adjacent to the side of the member opposite to the locality of its engagement with the reaction ring. As shown, the chain is preferably arranged within the member and constitutes a flexible, radially laminated core, each of its links being formed with circularly concave and convex ends to facilitate pivotal end-to-end nesting relationship. As thus organized the magnetic flux is primarily concentrated in a path extending from a starting point in the stator, across a minimal air gap, and radially through a first locality of the tubular member, thence dividing and threading circumferentially through the armature chain links in opposite directions, passing next through the member at a point diametrically opposite the first locality mentioned, and finally threading circumferentially through the stator to return to the starting point therein.

In a second and often preferred form of the armature means, a metallic strip of suitable width and high permeance is coiled upn itself. This "clockspring" type armature has such thinness as to be flexible and hence, in response to the field energization, can assume an ellipsoidal shape the major axis of which rotates effectively to impart corresponding synchronous deformation in the flextube or flexspline.

Another illustrative variant form of armature means, useful where a lower efficency is acceptable, features a rigid, radially laminated core rotatable with the tubular output member, and a surrounding flux-transmitting blanket of magnetic particles customarily referred to as "powder." The core is preferably slotted peripherally to accommodate shifting of the powder, especially where the output member undergoes inward deflection, during advance of the flux field. In this arrangement the flux path primarily emanates from stator pole tips, passes radially through the output member, then through a magnetically "frozen" bridge or rigidified powder gap of the particles, and into the core tips and across the center of the core.

The above and other features of the invention together with novel details of construction will now be more particularly described with reference to illustrative embodiments thereof and in connection with their accompanying drawings, in which—

FIG. 1 is a view in side elevation, and partly in axial section of an electromagnetic actuator, and indicating relation of its stator, flexible output member, reaction ring, and a powder-core type armature;

FIG. 2 is a section taken on the line II—II of FIG. 1, the stator now being energized;

FIG. 3 is an enlarged transverse section showing a quadrant of the deflected flexspline and its interengaged ring gear of FIG. 1, assuming stator energization;

FIG. 4 is a view corresponding to FIG. 3 except that the teeth are omitted from what was the flexspline and ring gear to permit their rolling frictional engagement thus indicating an alternate form of actuator;

FIG. 5 is a section taken on the line V—V of FIG. 1, and on a reduced scale, and showing somewhat schematically a "clockspring" form of armature arrangement;

FIG. 6 is a fragmentary view of a variant of the tubular output member of FIG. 1, the member being of nonconductive plastic and having embedded therein circular, spaced reinforcing wires extending transversely of the member;

FIG. 7 is a view of a modified form of actuator, largely corresponding to that of FIG. 1 but showing armature means of an endless chain type;

FIG. 8 is a section taken on the line VIII—VIII of FIG. 7, but assuming the stator to be energized;

FIG. 9 is an enlarged transverse section showing a quadrant of the deflected flexspline of FIG. 7, assuming energization, and its interengaged ring gear;

FIG. 10 is a view corresponding to FIG. 9 except that the teeth are omitted from what were the flexspline and the ring gear to permit their rolling frictional engagement as in an alternate form of the actuator; and FIG. 11 is an enlarged detail to indicate alternate forms of the devices of FIGS. 1–5 or 7–11 when the reaction ring is omitted as a separate part and the stator core takes its place.

Referring first to FIGS. 1–3, an output shaft 12 is rotatably journaled in end plates 14, 16 of a stationary housing, desirably of aluminum, having a cylindrical frame portion 18 and generally designated 20. For holding the device in assembled relation and securing a reaction ring gear 22 (which may be of bronze) in fixed coaxial relation to the shaft, retaining rods 24 (one only shown in FIGS. 1 and 2) extend axially through spacers 26, 28 and 30 (FIG. 1), respectively, and through the ring gear and the end plates, nuts 32 being threaded onto the ends of the rods.

A harmonic drive tubular flexspline generally designated 34, shown in FIG. 1 as being of the configuration disclosed in copending application Serial No. 108,600, (now Patent 3,091,979) filed May 8, 1961, in the names of Hans Frederick Schaefer, Jr. and Frederic B. Jennings, though not necessarily of this type, has a cylindrical open end portion 36, an intermediate portion formed externally with spline teeth 38 (FIGS. 1 and 3) for interengaging at circumferentially spaced localities with the ring gear 22, and a radially flanged mounting end 40 secured to a collar 42 fast on the shaft 12. The flexspline 34 is in this instance to function as the harmonic drive output member and is to be radially deflected at its open and toothed intermediate portions 36, 38 from circular to ellipsoidal shape by electromagnetic means to be described, but it will be appreciated that in accordance with principles set forth in the above cited Musser patent other operative lobar shapes may be employed without departing from the scope of this invention. Also, it will be understood that the row of teeth will be less by two, or a multiple thereof, on the flexspline 34, though the pitch diameters of the ring gear and the relaxed flexspline are the same, as taught in the Musser patent, the numbers of teeth determining the reduction ratio of the gearing.

For electromagnetically propagating a wave of radial deflection circumferentially in the flexspline thus to effect and advance its spaced localities of tooth interengagement with the ring gear 22, the actuator housing supports a laminated, slotted stator 44 having a unidirectional, continuously rotatable flux field. Accordingly, this stator may correspond to that of a conventional 2 or 3 phase A.C. induction motor. A laminated core 46 (FIG. 1) of the stator has the usual circularly disposed core tips (not shown) which extend radially inward for substantially tangent relation to the horizontal or straight-sided portion of the flexspline major axis. Responsive to the smoothly rotating flux field induced by the properly phased currents in the stator is an armature generally designated 50 (FIGS. 1–3) comprised of a rigid, radially laminated core 52, a surrounding layer of magnetic particles 54, for instance powdered iron, and a pair of axially spaced diaphragms 56 for retaining the powder between the core 52 and the inner side of the flexspline and opposite to the stator core 46. It is to be noted that, as indicated in FIGS. 2 and 3, the confined annular space defined by the diaphragms, flexspline, and armature core 52 is preferably not fully occupied by the powder, slots 58 (FIG. 3) in the periphery of the core 52 providing reservoirs into which the powder can move as the minor axis of the flexspline passes, that is to say, as the primary flux path progresses elsewhere. For adjustably securing the armature 50 to the shaft, a pair of clamping rings 60, 60 abuts the outer sides of the diaphragms, respectively, threadedly receiving set screws 62 engageable with the shaft.

An alternate construction of the actuators of FIGS. 1–5 (or FIGS. 7–10) permits elimination of a separate ring or gear 22 by merely cutting teeth 63 (FIG. 11) internally on the stator laminations 46 and correspondingly shifting the teeth 38 axially. In lieu of the teeth 63, the stator may merely have a cylindrical friction surface.

In operation the device of FIGS. 1–4 acts as a synchronous motor. Three-phase sine wave A.C. currents, properly phased and led to the coil of the stator 44, produce a smoothly rotating flux field, the resultant electromagnetic waves traveling diametrically across the armature means 50 and exerting outwardly attracting, balanced forces thereon, thereby imposing a rotary ellipsoidal shape. The major diameter of this shape has then been enlarged by substantially the same amount in both the flexspline portion 36 being radially deflected by the powder 54 (as shown in FIG. 2) and in the portion 38 where its teeth become fully engaged at diametrically spaced localities with the ring gear 22 (as indicated in FIG. 3). It will also be apparent from FIGS. 2 and 3 that at the minor axis (in the localities of non-engagement of the perimeter of the flexspline) the powder 54 not only is not being forced radially outward, but is displaced inwardly and hence occupies more, but not all, of the respective slots 58 in the vicinity. In the major axis localities of the tips of the core 52 where the densest flux occurs the powder "builds up" and is caused to rigidify in bridging effect, thus effectively transmitting radial force while deflecting the flexspline. There thus is considerable reduced reluctance in these powder bridge localities but, since powder is of relatively low permeability compared to solid material, a lower torque capability is found than in the chain type armature next to be described. When the flexspline is wholly of metal there is, of course, some flux leakage, but a plastic flexspline may be used for some applications yet provide the desired strength as well as low flux leakage when, as indicated in FIG. 6, wires 64 or other suitable metallic elements embedded in the plastic reinforce the portion 36. They may extend circularly about the axis of rotation and be axially spaced to reduce eddy current loss.

The schematic section of FIG. 5 shows, in deenergized condition, a different form of the invention wherein a novel and especially desirable armature 66 is employed other parts of the actuator remaining essentially as described with respect to FIGS. 1–4. A flat, metallic strip 68 of high permeance is coiled like a clock spring and has a plurality of convolutions, their radial spacing in FIG. 5 being shown magnified merely for clarity of illustration. The width of the strip 68 may correspond to the axial length of the stator core 46, and its thickness may, for instance, be in the range of from .001–.008 inch when ferrous shim stock is used, depending on the stiffness desired in the armature. Thus the strip thickness is normally considerably less than that of the deflectable wall of the flextube. In its relaxed condition the outside layer of the strip 68 is substantially circular and tangential with the circular inner wall of the portion 36, but upon field energization the outside layer (the inside layer if the armature 66 is mounted externally of the flextube and the stator is arranged internally) of the strip 68 becomes most highly saturated with flux and is caused by attracting magnetic forces to assume an ellipsoidal, flextube-engaging shape which is thereby imposed on the flextube 34. At the diametrically opposed localities of flux concentration the several convolutions of the strip move radially outward better to accommodate the concentrated flux path, while the ends of their minor diameters move inwardly to permit division of the flux path. As the flux field rotates, the major diameter of the armature 66 and of the flextube are caused to rotate synchronously. Performance of the clock spring type armature has generally proved about equal to that of the other types herein disclosed, and it is superior from the standpoint of economy and simplicity of design.

The actuating device of FIGS. 7–10, inclusive, largely resembles that of FIGS. 1–4, like parts bearing like character references, and, accordingly, need not be described again except for its armature generally designated 70. The latter, as in the device of FIGS. 1–5, is coaxial with the tubular output member 34 and, because of the distributed windings of its phased current-carrying stator, has a flux density distribution that varies sinusoidally and is spread semicircularly about the axis of rotation. The armature 70 is of annular, endless chain configuration. Preferably it is comprised of multiple loops of rigid links 72, arranged side by side, and in nested, end-to-end, pivotal relation. Each link desirably has a semicircular convex end 74 and a mating concave end 76 (FIGS. 8–10). Taken together the links may be considered to constitute an axially laminated, radially deflectable annulus responsive to the rotating magnetic field. By way of contrast with the axially extending, pivotal lever type of armature disclosed in the stepping field actuator of the Spring et al. application Serial No. 258,707, cited above, wherein pivotal movement is about axes extending in a plane normal to the axis of rotary output, the links 72 relatively pivot with respect to adjoining links about axes parallel to the rotary axis. A pair of axially spaced retaining disks 78, 78 is affixed to the shaft 12 to abut the outermost link loops and thus determine the axial position of the armature 70.

In operation the primary path of magnetic flux passes radially through the flexspline from the stator 44, and then divides to pass circumferentially through the links 72, through the opposite side of the tubular member 34 and thence returns circumferentially in the stator. The armature 70, accordingly, assumes ellipsoidal shape, its major axis tending to close the air gap with the member 34 and being caused to rotate as the links 72 rotate with respect to their adjoining links. Consequent ellipsoidal shape is imposed on the tubular output member 54 and rotation of its shape, in reactional engagement with the ring 22 (FIG. 10) or the ring gear 22 (FIG. 9), produces rotation of the member 34 and the shaft 12.

The types of actuator herein disclosed are designed to operate at a constant average output speed for fixed input frequency and make use of the resulting magnetic wave when driven from a two or three phase power source. Though not illustrated herein, if variable speed is desired a variable frequency source having two outputs in quadrature could be employed for the purpose. Reversal of polarity to reverse direction of field rotation results in immediate reversal of output; other changes in input find similar high response in output. For a given application an actuator of either type would, for best results, be suitably modified in details such as input, size, proportion, and relative arrangement of parts as necessary to meet specific requirements. Actuators according to the invention will find a wide variety of applications, a few of the more obvious ones, by way of illustration only, being as drive motors for turntables, and to drive chart recorders, or magnetic tape recorders.

Having thus described our invention, what we claim as new and desire to secure by Letters Patent of the United States is:

1. In an electromagnetic actuator, a reaction ring, stator means for providing a continuously rotating, phased sine wave flux field about the axis of the reaction ring, a radially deflectable tubular output member coaxial with the reaction ring, and armature means on the opposite side of said output member from said reaction ring and magnetically responsive to the flux field for radially deflecting the output member at spaced peripheral localities into operative engagement with the reaction ring whereby said spaced peripheral localities of engagement are progressed circumferentially to drive the output member.

2. An actuator as set forth in claim 1 wherein the reaction ring is formed with internal teeth, and the tubular output member is of plastic material and has external teeth arranged to cooperate with said internal teeth.

3. An actuator as set forth in claim 2 wherein an annular portion of the output member extends between said stator means and said armature means, and said annular portion of the output member has embedded therein spaced metallic reinforcement elements extending circumferentially.

4. An actuator as set forth in claim 1 wherein said armature means comprises a flexible coil of magnetically permeable material arranged coaxially with the tubular output member and engageable therewith.

5. An actuator as set forth in claim 1 further characterized in that said armature means comprises an endless chain of rigid, magnetically responsive links disposed closely adjacent to the side of the output member opposite to its engagement with said reaction ring.

6. An actuator as set forth in claim 5 wherein said links are arranged in side-by-side relation, and in end-to-end pivotal relation.

7. An actuator as set forth in claim 6 wherein each link is formed with one end convex and its other end concave to facilitate its pivotal nesting in adjoining links of said chain.

8. An actuator as set forth in claim 1 further characterized in that the armature means comprises a rigid, laminated core coaxial with the output member, and surrounding magnetic particles adapted, upon energization of the stator means, radially to bridge between the core and said output member to effect its radial deflection.

9. An actuator as in claim 8 wherein the armature core is peripherally slotted, and the space between the output member and the slotted armature core is laterally defined by particle retaining means, the volume of said space being greater than the volume of said particles therein.

10. An electromagnetic actuator having high acceleration-deceleration response comprising a housing, an output shaft journaled therein, a flexible, tubular member coupled to one end of the shaft and coaxial therewith, a reaction ring gear fixedly secured to the housing and having internal teeth arranged for circumferentially spaced engagements with a lesser number of external teeth formed on an intermediate portion of said tubular member, armature means within the latter including a flexible, spring-like coil the outer convolution of which is displaceable radially for flextube engagement with, and ellipsoidal deflection of, the tubular member to effect the toothed engagements, and polyphase A.C. field means secured within the housing for rotatively distributing flux sinusoidally in said armature means to advance the localities of tooth engagement and thereby drive the output shaft synchronously.

11. The actuator of claim 10 wherein said armature coil is comprised of turns of thin, flat stock of high permeance, the axial width of which corresponds to that of the stator core of said field means.

12. In an electromagnetic rotary actuator, stator means for providing a continuously rotating, polyphased flux field, said stator means including a radially laminated annular core formed to provide a cylindrical reaction surface, a shaft-mounted flexible, tubular output member coaxial with said surface and having an annular portion radially deflectable into circumferentially spaced, progressive engagements with said reaction surface, and radially deformable armature means mounted on the opposite side of the tubular output member from the reaction surface, said armature means being magnetically responsive to the flux field for generation of its circumferential shape and for thereby correspondingly deflecting and progressing the shape of said annular portion to drive the output member.

13. An actuator as set forth in claim 12 wherein said stator reaction surface is formed internally of the stator core, and the armature means is mounted internally of the tubular output member.

14. An actuator as set forth in claim 13 further characterized in that said stator reaction surface is formed with axially extending spline teeth, and the output member is externally formed in its annular portion with spline teeth for cooperating with said spline stator teeth.

References Cited in the file of this patent

UNITED STATES PATENTS 2,906,143    Musser _____ Sept. 29, 1959